Sept. 25, 1962   G. E. CLARKE ET AL   3,055,269

AUTOMOBILE WARNING DEVICE

Filed July 5, 1960

INVENTORS:
GLENN E. CLARKE
BEN G. LASKEY
BY
ATTORNEYS 3,055,269
AUTOMOBILE WARNING DEVICE
Glenn E. Clarke, Redwood City, and Ben G. Laskey, Los Altos, Calif., assignors to Benruth Engineering and Manufacturing Company, Inc., a corporation of California
Filed July 5, 1960, Ser. No. 40,828
2 Claims. (Cl. 89—1.5)

This invention relates to signaling devices and particularly to one which can be operated readily from a point of control to provide a luminous signal under emergency conditions and this instantaneously.

When a vehicle such as an automobile, for example, breaks down on a well traveled highway, bridge or the like, it is highly desirable that the existence of an emergency condition be made known to oncoming traffic. Some jurisdictions, for example, require that a luminous signal flare be placed at some distance to the rear of the vehicle. For the operator of a disabled vehicle to make his way from a stalled vehicle to a point in the rear and place the signal is an operation attended with some hazard.

In accordance with the present invention, we provide a device which can be operated by the driver of a vehicle to discharge a signaling flare from the rear of the vehicle so that the flare will come to rest at some distance at the rear of the vehicle. Simultaneously with the discharge of the flare its ignition is effected, the vehicle operator having nothing to do but close an actuating circuit.

It is in general a broad object of the present invention to provide a device for discharging a flare from the vehicle, at the same time effecting its ignition. The invention includes other objects and features of advantage, some of which, together with the foregoing, will appear hereinafter when the flare discharging device of this invention is disclosed.

In the drawing accompanying and forming a part hereof, FIGURE 1 illustrates the device installed on a vehicle.

Figure 1:
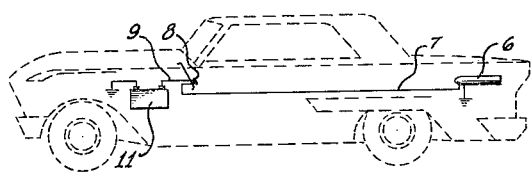

Referring to the drawing and particularly to FIGURE 1, the device includes a suitable casing generally indicated at 6 which is mounted, for example, on a rear fender of a car so that it is in good electrical contact therewith. An insulated wire 7 extends from the device, as will be described, to a switch generally indicated at 8 and located, for example, on the dash of the car. The other side of the switch is connected by a wire 9 to one terminal of storage battery 11, the other terminal of the battery being connected to the vehicle frame.

Figure 2:
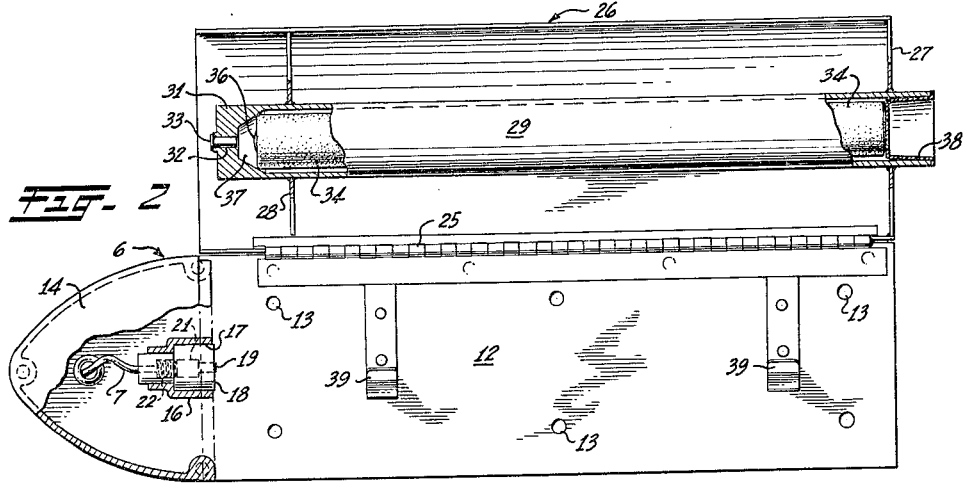
FIGURE 2 is a plan view of the device in its open position showing the details of the interior construction.
Figures 3, 4:
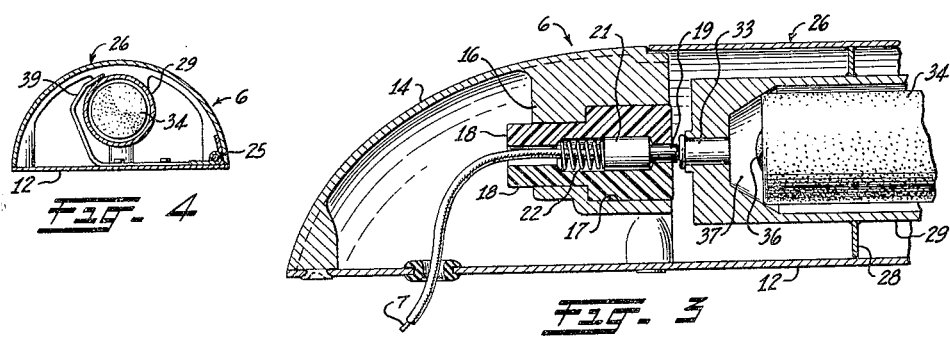
FIGURE 3 is an enlarged partial side view in section, showing the means employed for discharge of the flare and its ignition.
FIGURE 4 is a cross section taken through the device.

Referring particularly to FIGURES 2, 3 and 4, the casing 6 includes a base 12 having a plurality of holes 13 for attachment of the base to the fender or other portion of the car or vehicle. One end of the base is covered by an attached arcuate housing 14. Mounted in this arcuate housing is an integral support 16, the latter having a receptacle 17 formed of two cylindrical passages, one being slightly larger than the other. An insulated support 18 is fitted snugly in the receptacle; the support is made up of two like semi-cylindrical halves which, when fitted together, fill the receptacle 17. Mounted in the insulated support 18 is a contact element comprising a piece of carbon rod 19 having a metal base 21 provided thereon. The metal base is joined electrically to wire 7. A spring 22 is provided between the insulating support 18 and the metallic base, the spring serving to force the carbon rod so that it projects beyond the end of the insulating support 18.

Base 12 is covered in part by the semi-cylindrical housing 26, attached thereto by hinge 25. Housing 26 includes an end wall 27 and an intermediate wall 28 providing a support for a tube 29. At that end of the tube adjacent to the carbon rod, the tube 29 is closed as by the end closure 31. A receptacle 32 is provided in the end 31 and is of a size to receive a 22-calibre blank cartridge 33.

Mounted within the tube 29 is a signal flare, generally indicated at 34, the latter being of well known construction and having an ignition means 36 provided at that end adjacent to and in coaxial alignment with the blank cartridge. The interior of the end 31 is provided in the shape of a frustum of a cone, as indicated at 37. This insures that the force of the explosive gases from the blank cartridge is directed uniformly over the end of the flare, at the same time that the blast from the cartridge strikes and ignites the ignition means 36. At its other end, tube 29 is closed by a temporary plug 38 so that the flare remains in place and does not become dislodged or lost accidentally. Plug 38 is designed for frictional engagement in tube 29 but may be readily dislodged upon discharge of the flare. To retain the housing 26 in its closed position, spring clamps 39 are provided upon the base to engage the tube 29 and so retain the housing 26 in the closed position on the base 12.

Upon some emergency arising such that the operator of the vehicle wishes to provide a signal flare at the rear of the vehicle, it is only necessary to close switch 8 whereupon the blank cartridge is fired with the result that the flare is discharged from the tube in a lighted condition. Since it is ejected forcefully, it will come to rest at some distance to the rear of the vehicle if the latter happens to be standing still.

A particular feature of this invention is that the carbon rod 19 is movable in the insulating support 18. The discharge of the blank cartridge, of course, will provide a striking force on the carbon rod. If the latter is not resiliently supported, it may become chipped or broken and the device thus rendered inoperative.

Figure 5:
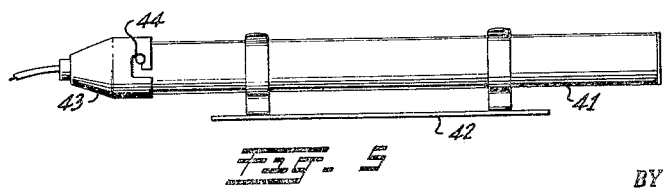
FIGURE 5 is a side elevation showing another manner of mounting a signal device embodying the invention.

In that form of the invention shown in FIGURE 5, the signal flare is mounted in a suitable container 41, the latter being held by a simple clamp device 42 which can be readily installed in any desired position on a vehicle. The carbon rod and electrical insulating support are provided in the end member 43 which is mounted on the tube 41 by the slot and bayonet pin lock indicated at 44, the construction of the device being otherwise the same as that previously described.

We claim:
1. A pyrotechnic signal device comprising a tubular container for a flare having an open end and a normally closed ignition end for receipt of that portion of a flare having ignition means thereon, said normally closed end being of decreased diameter inwardly thereof whereby when a flare is placed within said tubular container, a gas space remains between the said end of the said flare having said ignition means and said normally closed end of said tubular container, said ignition end of said tubular container having a receptacle therein for receipt of a blank cartridge, said receptacle serving to orient said blank cartridge into a confronting relationshhip relative to said ignition means of said flare when said flare and said blank cartridge are in place; a supporting member for said tubular container, said supporting member comprising an elongated base member having means for fastening said member to a vehicle body; a first housing hinged along one longitudinal edge of said base member, said housing having said tubular container integral therewith and positioned longitudinally therein parallel to the said longitudinal edge of the said base member, said housing substantially entirely covering said tubular container when said housing is hinged toward said base member and exposing the ignition end of said tubular member when said housing is hinged away from said base member; a second housing secured to said base member, said second housing being positioned adjacent and directly opposed to said receptacle for the said blank cartridge when said first housing is hinged toward said base member; a carbon element slidably mounted in the said second housing in direct opposition to the said receptacle for the said blank cartridge when said first housing is hinged toward said base member, said carbon element being positioned to be capable of contact with the said blank cartridge when the said blank cartridge is held in the said receptacle and said first housing is hinged toward said base member; resilient means secured in said second housing urging said carbon element into contact with a cartridge held in the said receptacle; and means for supplying electric current to the said carbon element.

2. A pyrotechnic signal device comprising a tubular container for a flare having an open end and a normally closed ignition end for receipt of that portion of a flare having ignition means thereon, said normally closed end being of decreased diameter inwardly thereof whereby when a flare is placed within said tubular container, a gas space remains between the said end of the said flare having said ignition means and said normally closed end of said tubular container, said ignition end of said tubular container having a receptacle therein for receipt of a blank cartridge, said receptacle, serving to orient said blank cartridge into a confronting relationship relative to said ignition means of said flare when said flare and said blank cartridge are in place; a housing detachably secured to said tubular container adjacent and directly opposed to the receptacle for the said blank cartridge; a carbon element slidably mounted in the said housing in direct opposition to the said receptacle for said blank cartridge, said element being capable of movement toward and away from the said receptacle, said carbon element being capable of contact with a blank cartridge when the latter is held in the said receptacle; resilient means secured in said housing urging said carbon element into contact with a cartridge held in the said receptacle; means supplying electric current to the said carbon element to heat said carbon element; and means remote from the said pyrotechnic signal device for permitting the flow of current through the said carbon element.

References Cited in the file of this patent

UNITED STATES PATENTS

| | | |
|---|---|---|
| 803,131 | Du Pont | Oct. 31, 1905 |
| 1,937,219 | Driggs | Nov. 28, 1933 |
| 1,947,834 | Driggs et al. | Feb. 20, 1934 |
| 2,199,990 | Godfrey et al. | May 7, 1940 |
| 2,436,751 | Hammell et al. | Feb. 24, 1948 |
| 2,882,794 | Bornheim et al. | Apr. 21, 1959 |